United States Patent [19]

Packard et al.

[11] Patent Number: 4,508,203

[45] Date of Patent: Apr. 2, 1985

[54] PLASTIC BOBBIN FOR ELECTROMAGNETIC CLUTCH

[75] Inventors: Gary R. Packard, Horseheads; Michael L. Mower, Elmira, both of N.Y.

[73] Assignee: Facet Enterprises, Incorporated, Tulsa, Okla.

[21] Appl. No.: 399,645

[22] Filed: Jul. 19, 1982

[51] Int. Cl.³ .............................................. F16D 27/10
[52] U.S. Cl. ............................. 192/84 C; 192/84 PM
[58] Field of Search ................. 192/40, 70.28, 84 B, 192/84 C, 84 PM, 106.1; 188/163, 164; 335/272, 281, 282; 384/295, 296, 297

[56] References Cited

U.S. PATENT DOCUMENTS

| | | | |
|---|---|---|---|
| 2,745,043 | 5/1956 | Ambrose | 335/282 |
| 3,114,862 | 12/1963 | Rice | 335/272 |
| 3,348,178 | 10/1967 | Erickson et al. | 335/281 |
| 3,435,392 | 3/1969 | Ouellette et al. | 335/272 |
| 3,671,900 | 6/1972 | Loughran, Jr. | 335/272 |
| 3,854,562 | 12/1974 | Wilczewski | 192/84 C |
| 4,126,215 | 11/1978 | Puro | 192/84 C |

*Primary Examiner*—Rodney H. Bonck
*Assistant Examiner*—James J. Merek
*Attorney, Agent, or Firm*—Remy J. VanOphem

[57] ABSTRACT

A non-magnetic molded plastic bobbin has a bore by which the bobbin is slip-fitted upon the cylindrical outer surface of the inner body carried by the rotating shaft. An integrally molded radial thrust flange at one end of the bobbin slip-fits against a radial flange of the inner body and defines an annular recess for the winding of a coil on the bobbin. The molded plastic bobbin also has an annular recess which extends concentric with the bore to receive the magnet body therewithin. A ridge is molded integrally with the bobbin on the wall thereof defining the magnet body annular recess and engages against the magnet body to retain the magnet body within the recess. A plurality of snap fingers are molded integrally with the bobbin and project inwardly from the bore thereof into slip-fitting relationship within an annular groove in the inner body to enable rotation of the inner body relative the stationary bobbin while retaining the bobbin axially relative the inner body. An integral axial extension of the bobbin abuts with a stationary clutch housing to retain the stationary field rotationally stationary during rotation of the inner body.

5 Claims, 3 Drawing Figures

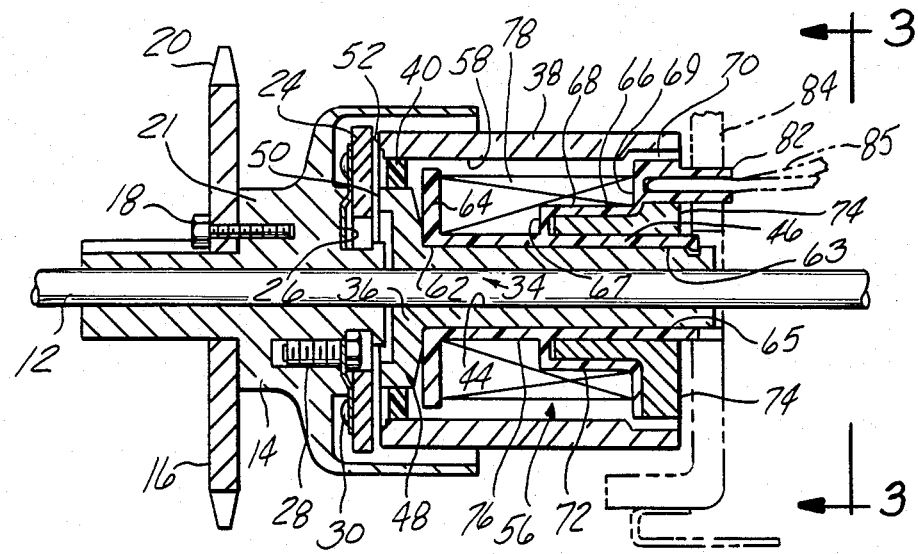
*Fig-1*
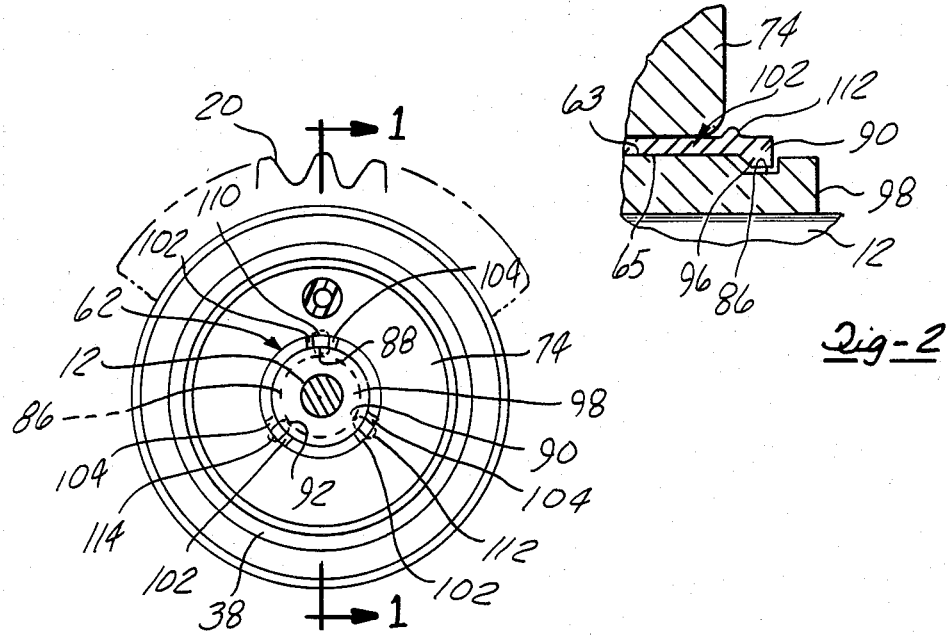
*Fig-2*
*Fig-3*

PLASTIC BOBBIN FOR ELECTROMAGNETIC CLUTCH

BACKGROUND OF THE INVENTION

The invention relates to a bobbin for an electromagnetic clutch and, more particularly, provides a molded plastic bobbin which defines the sleeve and thrust bearings between a stationary field and rotating inner body. The bobbin has an integral abutment engaging the clutch housing to prevent rotation of the stationary field and integral snap retention fingers extending into an annular groove of the inner body to retain the bobbin against axial movement. An integral ridge retains the magnet body with a recess defined within the bobbin.

DESCRIPTION OF THE PRIOR ART

It is well known to provide an electromagnetic clutch of the type having an axially movable armature which is drawn into engagement with a shaft mounted inner body by the energization of an electromagnetic coil. The axially movable armature is coupled to a drive gear or the like so that a drive torque is transmitted between the drive gear and the inner body or driven member upon engagement of the armature with the magnet body housing.

It is also well known as shown in U.S. Pat. Nos. 4,126,215, assigned to the assignee of this invention, and 3,854,562, to provide a stationary field including a toroidal coil which is wound upon a plastic bobbin and seated within a recess of a magnet body. The magnet body of the stationary field is separated from the rotating inner body by a cylindrical plastic sleeve which provides both axially extending sleeve and radial thrust bearings. U.S. Pat. No. 3,854,562 also provides an integral extension of the plastic bobbin which functions as a lead wire strain relief and also cooperates with a stationary clutch housing member to prevent rotation of the stationary field.

It would be desirable in the aforedescribed electromagnetic clutches to simplify the construction and assembly of the clutch by the provision of a plastic bobbin which would not only mount the electromagnetic coil, but also mount the magnet body and define both the sleeve and axial thrust bearings which isolate the stationary field from the inner body. Furthermore, it would be desirable to simplify the assembly of an electromagnetic clutch by eliminating the need for a snap ring or other fastener to secure the stationary field upon the rotating inner body.

SUMMARY OF THE INVENTION

According to the present invention, a non-magnetic, molded plastic bobbin has a bore by which the bobbin is slip-fitted upon the cylindrical outer surface of the inner body carried by the rotating shaft. An integrally molded radial thrust flange at one end of the bobbin slip-fits against a radial flange of the inner body and defines an annular recess for the winding of a coil on the bobbin. The molded plastic bobbin also has an annular recess which extends concentric with the bore to receive the magnet body therewithin. A ridge is molded integrally with the bobbin on the wall thereof defining the magnet body annular recess and engages against the magnet body to retain the magnet body within the recess. A plurality of snap fingers are molded integrally within the bobbin and project inwardly from the bore thereof into slip-fitting relationship within an annular groove in the inner body to enable rotation of the inner body relative to the stationary bobbin while retaining the bobbin axially relative to the inner body. An integral axial extension of the bobbin abuts with a stationary clutch housing to retain the stationary field coil rotationally stationary during rotation of the inner body.

It is, therefore, a primary object of this invention to provide a molded plastic bobbin having a stationary coil wound thereon and including a cylindrical bore and radial thrust flange which slip-fit upon the clutch inner body so that the bobbin also functions as the bearing which enables the stationary field to remain stationary while the inner body rotates.

It is a further object, feature and advantage of the invention to provide a molded plastic coil bobbin having integral snap fingers which seat within an annular groove of the rotating inner body to retain the bobbin against axial movement relative to the inner body while permitting rotation of the inner body relative to the stationary bobbin.

Furthermore, it is an object of the invention to provide a one-piece integrally molded plastic bobbin having sleeve bearing and radial thrust bearing portions slip-fitting with the clutch inner body, integral retention fingers slip-fitted in an annular groove of the inner body, an annular recess for receiving the magnet body with the magnet body retained therein by a retentive ridge, and an integral projection engageable with the stationary clutch housing to hold the bobbin stationary relative to the rotating inner body.

These and other objects, features and advantages of the invention become more apparent from the following detailed description taken in conjunction with the accompanying drawings.

BRIEF DESCRIPTION OF THE DRAWINGS

FIG. 1 is a cross-sectional view taken along lines 1-1 of FIG. 3 of an electromagnetic clutch in a de-energized condition showing the bobbin construction of the present invention;

FIG. 2 is an enlarged fragmentary view showing the integral snap fingers which slip-fit within an annular groove of the inner body to retain the plastic bobbin on the inner body;

FIG. 3 is a sectional view taken in the direction of arros 3-3 of FIG. 1.

DETAILED DESCRIPTION OF THE PREFERRED EMBODIMENT

Referring to FIG. 1, there is shown an electromagnetic clutch which is illustrative of the general type of clutch or electromagnetic brake which may embody the present invention. In particular, the embodiment shown in FIG.1 relates to a clutch which is electromagnetically engaged and spring released. However, it is to be understood that the present invention may be utilized in clutches which are spring applied and electromagnetically released as well as on brakes which are either electromagnetically applied or spring released or vice-versa.

The electromagnetic clutch of FIG. 1 functions to establish a driving connection between a rotatably journalled shaft 12 and a hub 14 which is rotatable on the shaft 12. A sprocket or gear 16 is attached to the hub 14 as by screws 18 and has teeth 20 which are adapted to mesh with a chain or a gear, not shown. Either the shaft 12 or the sprocket 16 may be the input member.

An annular armature plate 24 is connected to the hub 14 for unitary rotation therewith by a spring disc 26. The radial inner portion of the spring disc 26 is suitably attached to the hub as by bolts 28 and the radial outer portion of the spring disc 26 is suitably attached to the armature plate 24 as by rivets 30. The spring disc 26 is yieldable to permit axial movement of the armature plate 24 from the normal spring established position shown in FIG. 1.

The electromagnetic clutch also includes a body member 34 including an inner body 36 and an outer body 38 of magnetic material which are connected together in spaced apart relation by an annular member 40 which may be manufactured from various non-magnetic materials such as stainless steel, brass, plastic, etc. The inner body 36 has a bore 44 by which the inner body 36 is press-fit or otherwise attached upon the shaft 12 for unitary rotation therewith. The inner body 36 also has a cylindrical outer surface 46 and a radial flange 48 at the end of the inner body 36 generally adjacent the armature plate 24. The radial flange 48 defines a magnetic pole face 50 which is aligned with the armature plate 24. The outer body 38 has a similar magnetic pole face 52 which is also aligned with the armature plate 24.

A stationary field coil assembly, generally indicated at 56, is mounted within a cavity 58 defined between the inner body 36 and the outer body 38. A non-magnetic cylindrical bobbin 62 of molded plastic has a tubular body 63 with a central bore 65 which slip-fits upon the cylindrical outer surface 46 of the inner body 36. The plastic bobbin 62 also has a radial flange 64 which slip-fits against the radial flange 48 of the inner body 36. The slip-fitting relationship between the plastic bobbin 62 and the inner body 36 enables the plastic bobbin 62 to remain rotationally stationary during rotation of the inner body 36 with the shaft 12. The plastic bobbin 62 also has a stepped wall structure 66 including a radial wall 67, axial wall 68, radial wall 69 and axial wall 70 at the end thereof opposite the radial flange 64 and defining an annular recess 72 which provides a cavity for mounting a ferromagnetic magnet body 74. Furthermore, the radial flange 64 at one end of the plastic bobbin 62 and the stepped wall structure 66 at the other end cooperate to define an annular recess 76 within which an electromagnetic coil 78 is wound. The plastic bobbin 62 also includes an integrally molded axial extension 82 which receives a lead wire 85 and seats within a rotationally stationary clutch housing 84 to hold the stationary field coil assembly 56 rotationally stationary during rotation of the inner body 36 with the shaft 12.

Referring to FIGS. 2 and 3, it is seen that the plastic bobbin 62 is retained upon the inner body 36 by a snap retention structure which is integral with the plastic bobbin and engages within an annular groove on the inner body. As best seen in FIG. 2, the annular groove is designated 86 and is located at the end of the inner body 36 opposite the radial flange 48. As best seen in FIG. 3, the tubular body 63 of the plastic bobbin 62 has a plurality of radially spaced integral snap retention fingers 88, 90 and 92 which project radially inward from the bore 65 of the plastic bobbin 62 and seat within the annular groove 86 as shown in FIG. 2. The fingers include an angled cam face 96 which coacts with an end wall 98 of the body member 34 to impart a radially outward deflection force to the fingers 88, 90 and 92 when the plastic bobbin is installed upon the inner body 36. Longitudinal extending relief slots 102 and 104 are provided in the tubular body 63 at each side of the fingers 88, 90 and 92 so that the fingers are effectively mounted at the distal end of a radially yieldable spring leaf.

As best seen in FIG. 3, the tubular body 63 of the plastic bobbin 62 also has a plurality of radially spaced ridges 110, 112 and 114 which have an interference fit with the magnet body 74. As seen in FIG. 3, the ridges 110, 112 and 114 are preferably located in corresponding relation with the fingers 88, 90 and 92 so that they are effectively mounted at the distal end of the radially yieldable leaf spring structure provided by the longitudinally extending relief slots 102 and 104 provided at each side of the fingers. The magnet body 74 is preferably mounted within the annular recess 72 of the plastic bobbin 62 prior to the mounting of the bobbin upon the inner body 36. Accordingly, the insertion of the magnet body 74 within the annular recess 72 will coact with the ridges 110, 112 and 114 to deflect the ridges radially inward by the yieldable spring leaf action and then spring the ridges 110, 112 and 114 radially outward to their normal interference fit position of FIG. 2 to prevent removal of the magnet body 74 from the plastic bobbin 62. Furthermore, it will be appreciated that the presence of a magnet body 74 bearing upon the cylindrical surface of the tubular body 63 and the presence of the cylindrical outer surface 46 of the inner body 34 underlying the central bore 65 of the plastic bobbin 62 will cooperate to support the fingers and the ridges at their normal radial positions of FIG. 2.

It will be appreciated by one skilled in the art that the afore-described plastic bobbin structure for an electromagnetic clutch provides many features which are advantageous in the simplification of the construction and assembly of the clutch. The plastic bobbin not only mounts the electromagnetic coil but also mounts the magnet body and defines both the sleeve and axial thrust bearings which isolate the stationary field from the rotating inner body 36. The self-lubricating characteristic of the plastic eliminates the need for any lubrication between the rotating inner body and the stationary plastic bobbin. Furthermore, the present invention eliminates the need for a snap ring or other mechanical fastener for securing the stationary field upon the rotating inner body by the provision of a plurality of snap fingers integral with the plastic bobbin and projecting into running slip-fitting engagement with an annular groove on the rotating inner body. In addition, the plastic bobbin defines a recess or cavity for housing the magnet body and the magnet body is retained within the plastic bobbin without the necessity of a snap ring or other mechanical fastener by the provision of an integrally molded ridge on the plastic bobbin for interference fit with the magnet body.

While the preferred embodiment of the invention has been disclosed, it will be apparent to those skilled in the art that changes may be made to the invention as set forth in the claims and, in some instances, certain features of the invention may be used to advantage without corresponding use of other features. Accordingly, it is intended that the illustrative and descriptive materials herein be used to illustrate the principles of the invention and not to limit the scope therein. While the form of the embodiment of the invention herein disclosed constitutes a preferred form, it is to be understood that other forms might be adopted as may come within the scope of the claims which follow.

What is claimed is:

1. A bobbin for an electromagnetic clutch having a rotating ferromagnetic inner body having a radially flanged and grooved cylindrical outer surface, a coil, and a magnet body, comprising:

a non-magnetic, molded plastic, cylindrical bobbin having a bore slip-fitting upon the cylindrical outer surface of the inner body, an integrally molded radial thrust flange at one end of the bobbin slip-fitting against the radial flange of the inner body and defining an annular coil recess, and integrally molded slip finger means at the other end of the bobbin and projecting inwardly of the bobbin bore and slip-fitting within the groove of the inner body to enable rotation of the inner body relative the bobbin while retaining the bobbin axially relative the inner body; and said bobbin further comprising an integral extension extending axially away from said annular coil recess and adapted to be mounted to a stationary housing structure.

2. The combination of claim 1 further characterized by said bobbin having an integrally molded wall structure defining a recess for mounting the magnet body therein and an integral retentive ridge engageable with the magnet body to retain the magnet body within the recess.

3. An electromagnetic clutch for selectively coupling a first clutch member with a second clutch member comprising:

a ferromagnetic armature plate coupled with the first clutch member for unitary rotation therewith and movable axially of the first clutch member for driving engagement with the second clutch member upon application of a magnetic force thereto;

a ferromagnetic inner body carried by the second clutch member for unitary rotation therewith, said inner body further having a cylindrical outer surface and a radial flange at the one end adjacent the armature plate;

a non-magnetic, molded plastic, cylindrical bobbin having a tubular body rotatably mounted on the cylindrical outer surface of the inner body, said cylindrical bobbin further having an integrally molded radial thrust flange at one end of the tubular body located against the radial flange of the inner body and a magnet body recess formed by an integrally molded stepped wall structure disposed extending radially outward from said tubular body and axially coextensive therewith, said stepped wall structure located at the opposite end of the tubular body from said radial thrust flange and defining an annular coil recess therebetween;

said bobbin also including an integral extension extending axially away from said magnet body recess and adapted to be mounted to a stationary housing structure;

a magnet body mounted within said magnet body recess of the bobbin; and a coil wound within the annular coil recess of the bobbin and energizable to move the armature axially of the first clutch member for engagement with the second clutch member to effect a coupling of the first clutch member with the second clutch member.

4. An electromagnetic clutch for selectively coupling a first clutch member with a second clutch member comprising:

a ferromagnetic armature plate coupled with the first clutch member for unitary rotation therewith and movable axially of the first clutch member for driving engagement with the second clutch member upon application of magnetic force thereto;

a ferromagnetic inner body carried by the second clutch member for unitary rotation therewith and having a cylindrical outer surface having a radial flange at the one end adjacent the armature plate and having a circumferentially extending groove spaced axially away from the radial flange;

a non-magnetic, molded plastic, cylindrical bobbin having a bore slip-fitting upon the cylindrical outer surface of the inner body, an integrally molded radial thrust flange at one end of the bobbin slip-fitting against the radial flange of the inner body and defining an annular coil recess, and integrally molded slip finger means at the other end of the bobbin and projecting inwardly of the bobbin bore and slip-fitting within the groove of the inner body to enable rotation of the inner body relative the bobbin while retaining the bobbin axially relative to the inner body;

said bobbin also including an integral extension extending axially away from said annular coil recess and adapted to be mounted to a stationary housing structure; and a coil wound within the annular coil recess of the bobbin and energizable to move the armature axially of the first clutch member for engagement with the second clutch member to effect a coupling of the first clutch member with the second clutch member.

5. An electromagnetic clutch for selectively coupling a first clutch member with a second clutch member comprising:

a ferromagnetic armature plate coupled with the first clutch member for unitary rotation therewith and movable axially of the first clutch member for driving engagement with the second clutch member upon application of magnetic force thereto;

a ferromagnetic inner body carried by the second clutch member for unitary rotation therewith and having a cylindrical outer surface having a radial flange at the one end adjacent the armature plate and having a circumferentially extending groove spaced axially away from the radial flange;

a non-magnetic, molded plastic, cylindrical bobbin having a tubular body with a bore slip-fitting upon the cylindrical outer surface of the inner body, an integrally molded radial thrust flange at one end of the tubular body slip-fitting against the radial flange of the inner body and cooperating therewith to define an annular coil recess therebetween, an integrally molded wall structure cooperating with the tubular body to define an annular magnet body recess therebetween, and integrally molded slip finger means at the other end of the tubular body projecting inwardly of the bobbin bore and slip-fitting within the groove of the inner body to enable rotation of the inner body relative the bobbin while retaining the bobbin axially relative the inner body;

said bobbin also including an integral extension extending axially away from said annular coil recess and adapted to be mounted to a stationary housing structure;

a magnet body mounted within the magnet body recess of the bobbin; and a coil wound within the annular coil recess of the bobbin and energizable to move the armature axially of the first clutch member for engagement with the second clutch member to effect a coupling of the first clutch member with the second clutch member.

* * * * *

UNITED STATES PATENT AND TRADEMARK OFFICE
CERTIFICATE OF CORRECTION

PATENT NO. : 4,508,203
DATED : April 2, 1985
INVENTOR(S) : Gary Richard Packard, et al.

It is certified that error appears in the above-identified patent and that said Letters Patent is hereby corrected as shown below:

Column 2, line 45, after the semi-colon ";" insert ---- and ----.

Column 4, line 24, before "cylindri-" insert ---- outer ----.

Column 4, line 27, delete the numeral "34" and insert the numeral ---- 36 ----.

Signed and Sealed this

Twenty-seventh Day of August 1985

[SEAL]

Attest:

DONALD J. QUIGG

Attesting Officer

Acting Commissioner of Patents and Trademarks